(12) United States Patent
Huang

(10) Patent No.: US 6,741,457 B2
(45) Date of Patent: May 25, 2004

(54) OPTICAL DISK DRIVE MODULE WITH AN ENGAGING SWITCH

(75) Inventor: Chin-Chuan Huang, Taipei Hsien (TW)

(73) Assignee: Wistron Corporation, Hsi-Chih (TW)

( * ) Notice: Subject to any disclaimer, the term of this patent is extended or adjusted under 35 U.S.C. 154(b) by 0 days.

(21) Appl. No.: 10/063,947

(22) Filed: May 28, 2002

(65) Prior Publication Data

US 2003/0063434 A1 Apr. 3, 2003

(30) Foreign Application Priority Data

Sep. 28, 2001 (TW) ..................................... 090124207 A

(51) Int. Cl.[7] ................................................ G06F 1/16
(52) U.S. Cl. ....................... 361/681; 361/683; 361/685; 361/686
(58) Field of Search ................................ 361/679, 681, 361/683–686

(56) References Cited

U.S. PATENT DOCUMENTS

| | | | |
|---|---|---|---|
| 5,021,922 A | * 6/1991 | Davis et al. | 361/380 |
| 5,305,180 A | * 4/1994 | Mitchell et al. | 361/685 |
| 6,188,569 B1 | * 2/2001 | Minemoto et al. | 361/683 |

OTHER PUBLICATIONS

Jackson, Jr. (US 2002/0149905 A1), "Flat Hanging Computer", Oct. 17, 2002.*
Farrow et al. (US 2003/0063432 A1), "All–In–One Personal Computer With Toll–less Quick–Release Features For Various Elements Thereof Including A Reusable Thin Film Transistor Monitor", Apr. 3, 2003.*
Zodnik (US 2002/0126443 A1), "Computer In A Wall", Sep. 12, 2002.*
Huang (US 2003/0063433 A1), "Optical Disk Drive Module With An Electromagnetic Switch", Apr. 3, 2003.*

* cited by examiner

Primary Examiner—Darren Schuberg
Assistant Examiner—Yean-Hsi Chang
(74) Attorney, Agent, or Firm—Winston Hsu

(57) ABSTRACT

An optical disk drive module with an engaging switch installed in a flat panel display personal computer is provided for lifting up and lowering a disk drive. The optical disk drive module includes a chassis module, a drive carrier, a cover, a button, and an engaging switch. When a user depresses the button, the button will push the engaging switch to separate the engaging switch from the cover, and the drive carrier will swing away from the chassis module to expose the disk drive below the flat panel display.

10 Claims, 6 Drawing Sheets

OPTICAL DISK DRIVE MODULE WITH AN ENGAGING SWITCH

BACKGROUND OF THE INVENTION

1. Field of the Invention

The present invention relates to an optical disk drive module, and more specifically, the present invention discloses an optical disk drive module with an engaging switch.

2. Description of the Prior Art

In general, a desktop computer includes a display device and a computing module coupled with the display device. As a result of a separating design between the computing module and the display device, the desktop computer thus occupies a lot of space. Therefore, a liquid crystal display personal computer (LCD PC) is widely used for combining the computing module with the display device so as to occupy less space than the desktop computer.

Please refer to FIG. 1. FIG. 1 is a side view of a flat panel display personal computer 100 according to the prior art. The flat panel display personal computer 100 comprises a computing module 102, a flat panel display 104, and a chassis 106. A rear side of the flat panel display 104 is coupled with a side plate 102a of the computing module 102, and a bottom plate 102b of the computing module 102 is disposed on the chassis 106 so as to allow the chassis 106 to support the computing module 102 and the flat panel display 104. An LCD panel 107 is disposed at a front side of the flat panel display 104 for displaying image frames of the flat panel display personal computer 100. The computing module 102 comprises a motherboard 108, a central processing unit (CPU) 110, a random access memory (RAM) 112, and a hard disk 114. The CPU 110, the RAM 112, and the hard disk 114 are all coupled with the motherboard 108. The CPU 110 is used to process information and data of the flat panel display personal computer 100, the RAM 112 is used to register the information and data for processing by the CPU 110, and the hard disk 114 is used to store the data.

The chassis 106 has an optical disk drive 116 installed inside the chassis 106 for accessing data of an optical disc positioned within the optical disk drive 116. However, the optical disk drive engages with the chassis 106 via a number of screws, meaning that a user must utilize a screwdriver or other auxiliary tools to install or detach the optical disk drive 116. If threads of the screws become worn or rusted, the user must spend more energy and time on installing and detaching the optical disk drive 116. Although the user can directly access the optical disk drive 116 at a right side of the flat panel display personal computer 100, it is a blemish in an otherwise perfect design that the optical disk drive 116 cannot be hidden at the rear side of the flat panel display 104 while accessing the data of the optical disc.

SUMMARY OF THE INVENTION

It is therefore a primary objective of the claimed invention to provide an optical disk drive module with an engaging switch. The optical disk drive module is installed inside a flat panel display personal computer for hiding the optical disk drive at a rear side of the flat panel display while accessing data of an optical disc so as to reduce occupied space of hardware. Furthermore, when a user wishes to operate the optical disk drive, the user can utilize the optical disk drive module to lower the optical disk drive through the use of a button and the engaging switch.

The claimed invention, briefly summarized, discloses an optical disk drive module installed in a flat panel display personal computer for lifting up and lowering a disk drive. The optical disk drive module includes a chassis module, a drive carrier, a cover, a button, and an engaging switch. When a user depresses the button, the button will push the engaging switch to separate the engaging switch from the cover, and the drive carrier will swing away from the chassis module to expose the disk drive below the flat panel display.

It is an advantage of the claimed invention that the claimed flat panel display personal computer can utilize the optical disk drive module to conceal the disk drive at a rear side of the flat panel display so as to reduce space occupied by hardware. It is also an advantage that the flat panel display personal computer can utilize the button and the engaging switch to allow the optical disk drive module to lower the disk drive so as to reveal the disk drive to a front side of the flat panel display.

These and other objectives and advantages of the claimed invention will no doubt become obvious to those of ordinary skill in the art after reading the following detailed description of the preferred embodiment that is illustrated in the various figures and drawings.

DETAILED DESCRIPTION

The present invention provides an optical disk drive module installed in a flat panel display personal computer for lifting up and lowering a disk drive. The flat panel display personal computer comprises a flat panel display and a computing module coupled with a rear side of the flat panel display.

The optical disk drive module comprises a chassis module, a drive carrier, and a cover. The chassis module is moveably disposed at the rear side of the flat panel display and has a chassis body. The drive carrier is rotatably disposed in the chassis module. The cover is fixed outside the disk drive and slidably fastened within the drive carrier so as to dispose the disk drive in the drive carrier. In particular, the present invention designs an engaging switch for users to control the optical disk drive module. Application of the present optical disk drive module will be described with figures of the preferred embodiment illustrated as follows.

Figure 1:
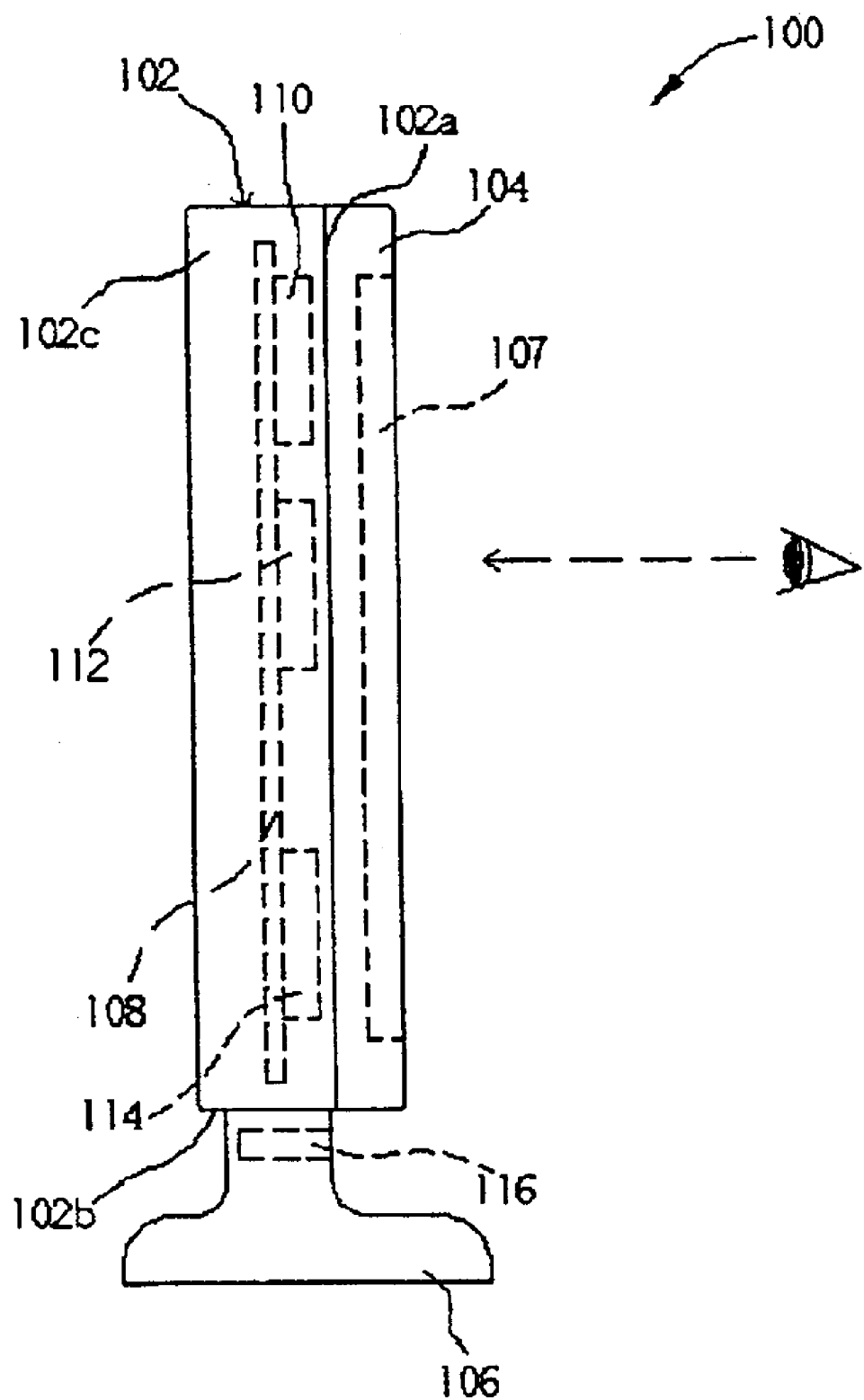
FIG. 1 is a side view of a flat panel display personal computer according to the art.
Figure 2:
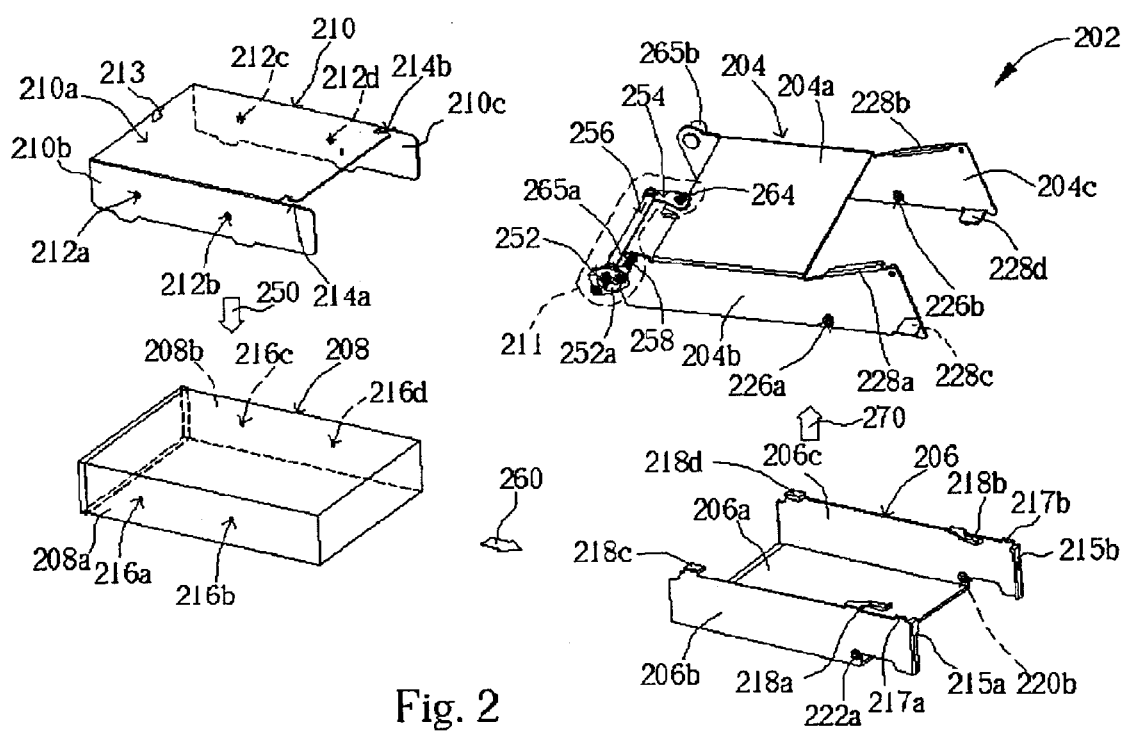
FIG. 2 is an exploded diagram of an optical disk drive module with an engaging switch, according to the preferred embodiment of the present invention.
Figure 3:
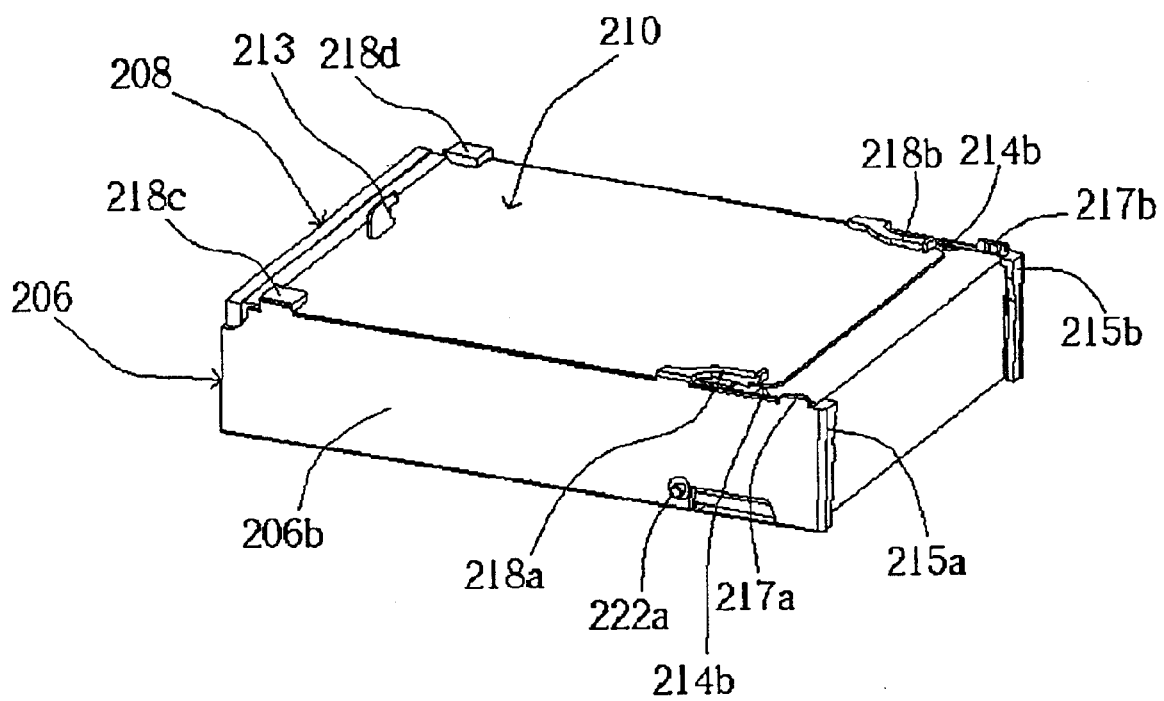
FIG. 3 is a perspective view of an optical disk drive fabricated with a cover and a drive carrier.

Please refer to FIG. 2 and FIG. 3. FIG. 2 is an exploded diagram of an optical disk drive module 202 with an engaging switch, according to the preferred embodiment of the present invention. FIG. 3 is a perspective view of the optical disk drive module 202 depicted in FIG. 2 fabricated with a cover and a drive carrier. As shown in FIG. 2, the optical disk drive module 202 comprises a chassis module 204, a drive carrier 206, a disk drive 208, a cover 210, an engaging switch 211, and a button (not shown in FIG. 2).

The cover 210 comprises a cover body 210a, a switch hook 213, and two side plates 210b and 210c. The cover body 210a and the side plates 210b and 210c can be formed in rectangular shapes. The switch hook 213 is vertically positioned on a left side of the cover body 210a for engaging with the engaging switch 211, and the side plates 210b and 210b are respectively formed at two sides of the cover body 210a for forming the U-shape cover 210 with the cover body 210a. Of course, the cover body 210a, the switch hook 213, and the side plates 210b and 210c can also be formed monolithically. The side plate 210b has two openings 212a and 212b, and the side plate 210c also has two openings 212c and 212d. The cover body 210a has two positioning slots 214a and 214b positioned on a lower-right end and an upper-right end, respectively.

Furthermore, the disk drive 208 comprises a side plate 208a with two fixing openings 216a and 216b, which are located corresponding to the openings 212a and 212b. The disk drive 208 also has a side plate 208b opposite to the side plate 208a with two fixing openings 216c and 216d, which are located corresponding to the openings 212c and 212d.

When a user places the cover 210 onto the disk drive 208 along an arrow direction 250, the openings 212a, 212b, 212c, and 212d exactly correspond to the fixing openings 216a, 216b, 216c, and 216d, respectively. Then, the user can utilize four screws to respectively pass through the openings 212a, 212b, 212c, and 212d and tightly lock the fixing openings 216a, 216b, 216c, and 216d, allowing the cover 210 to be detachably disposed on the disk drive 208.

It needs to be noted that the cover 210 is formed according to a shape of the disk drive 208, and locations and numbers of the openings of the cover 210 are in accordance with the locations and numbers of the fixing openings of the disk drive 208. The disk drive 208 can also be monolithically formed with the cover 210.

The drive carrier 206 comprises a carrier body 206a and two side plates 206b and 206c respectively formed at two sides of the carrier body 206a for forming the U-shape drive carrier 206 with the carrier body 210a. Of course, the carrier body 206a and the side plates 206b and 206c can be formed in rectangular shapes or be monolithically formed. The side plate 206b has two positioning hooks 218a and 218c positioned at two upper ends of the side plate 206b, and the side plate 206c also has two positioning hooks 218b and 218d positioned at two upper ends of the side plate 206c. The positioning hooks 218a and 218b are used to respectively engage with the positioning slots 214a and 214b of the cover 210, and the positioning hooks 218c and 218d are used to engage with a left side of the cover body 210a. Therefore, the positioning hooks 218a, 218b, 218c, and 218d are all capable of preventing the disk drive 208 and the cover 210 from separating from the drive carrier 206. Right ends of the side plates 206b and 206c are both stretched out of the carrier body 206a and respectively have two stoppers 215a and 215b for pushing against a right side of the disk drive 208 and for further positioning the disk drive 208 so as to prevent the disk drive 208 from separating from the drive carrier 206. Additionally, the side plates 206b and 206c further comprise two protruded portions 222a and 222b, respectively, for engaging with the chassis module 204, and two protruded pieces 217a and 217b respectively positioned at upper ends of the side plates 206b and 206c.

After the cover 210 is positioned onto the disk drive 208, the user pushes the disk drive 208 to slide into the drive carrier 206 along an arrow direction 260. After performing the aforementioned installation process, the positioning hooks 218a and 218b will exactly engage with the positioning slots 214a and 214b, the positioning hooks 218c and 218d will push against the left sides of the cover 210 and the disk drive 208, and the stoppers 215a and 215b will push against the right side of the disk drive 208 so as to slidably engage the cover 210 within the drive carrier 206 and to expose the switch hook 213 outside the drive carrier 206.

As shown in FIG. 3, the disk drive 208 therefore can be slidably fastened within the drive carrier 206 via the cover 210. It needs to be noted that the present invention can also design the positioning slots and the switch hook corresponding to the positioning hooks 218a and 218b to reduce production costs of the cover 210. The user can directly insert a disk drive with positioning slots into the drive carrier 206, and the positioning hooks 218a and 218b will engage with the positioning slots of the disk drive so as to achieve a positioning effect. Furthermore, the disk drive 208 and the drive carrier 206 can also be positioned using other engaging methods. That is, if the disk drive 208 needs to be detached from the drive carrier 206, the user only needs to release the positioning hooks 218a and 218b of the drive carrier 206, and the disk drive 208 can be pulled out of the drive carrier 206.

The chassis module 204 comprises a chassis body 204a, and two side plates 204b and 204c. The chassis body 204a and the side plates 204b and 204c can be formed in rectangular shapes. The side plates 204b and 204c are respectively formed at two sides of the chassis body 204a for forming the U-shape chassis module 204 with the chassis body 204a. Of course, the chassis body 204a, and the side plates 204b and 204b can also be formed monolithically. Right ends of the side plates 204b and 204c are both stretched out of the chassis body 204a.

Figure 4:
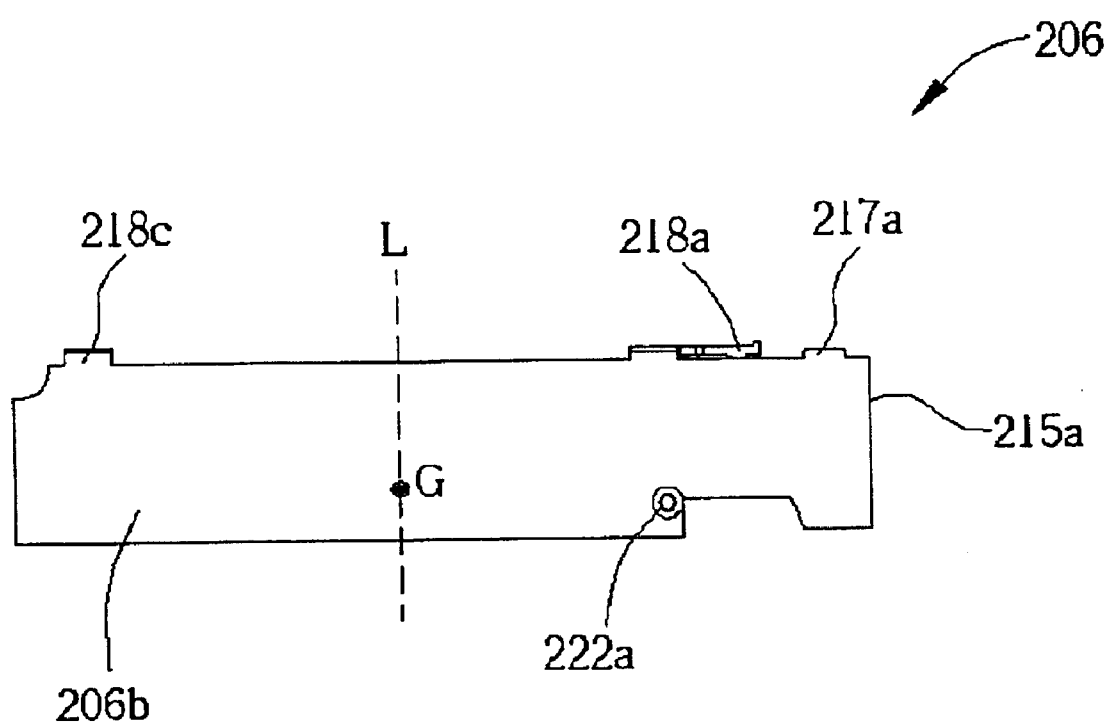
FIG. 4 is a side view of the drive carrier.

Please refer to FIG. 4. FIG. 4 is a side view of the drive carrier 206 depicted in FIG. 2. As shown in FIG. 4, if the drive carrier 206 has a center of gravity G located at a central line L of the drive carrier 206, the present invention must design the protruded portion 222a to be positioned between the enter of gravity G and the stopper 215a. Similarly, the protruded portion 222b of FIG. 2 must be positioned between the center of gravity G and the stopper 215b. Therefore, the drive carrier 206 will rotate by using the protruded portions, 222a and 222b as pivots to move downward due to the gravity of the drive carrier 206 itself.

To control rotation extent of the drive carrier 206, the present invention provides two chassis stoppers 228a and 228b respectively disposed on the upper ends of the side plates 204b and 204c to push against the protruded pieces 217a and 217b after the drive carrier 206 is swung away from the chassis module 204. The present invention further provides two chassis stoppers 228c and 228d respectively disposed on the lower ends of the side plates 204b and 204c to push against the right sides of the side plates 206b and 206c after the drive carrier 206 is swung toward the chassis module 204. Therefore, the chassis stoppers 228a, 228b, 228c, and 228d are used to control swinging angles of the drive carrier 206. The side plates 204b and 204c further comprises two engaging openings 265a and 265b respectively positioned at the left sides of the side plates 204b and 204c for fastening to a flat panel display personal computer, and two apertures 226a and 226b respectively positioned at the right sides of the side plates 204b and 204c for fastening to the protruded portions 222a and 222b.

Especially important, the present invention designs an engaging switch 211 on the chassis module 204. The engaging switch 211 comprises an engaging unit 252, a fastening unit 254, and a connecting unit 256. The engaging unit 252 is disposed on a left side of the side plate 204b, and a plurality of elastic elements 258 are used to separate the engaging unit 252 and the side plate 204b by a predetermined distance. The engaging switch 211 further comprises a protruded piece 252a formed on one side of the engaging unit 252 for accepting external force so as to allow the engaging unit 252 to move toward the side plate 204b. The fastening unit 254 is moveably disposed on a left side of the chassis body 204a through a protruded portion 264 for securing onto the switch hook 213. The connecting unit 256 is connected between the engaging unit 252 and the fastening unit 254. When the protruded piece 252a is compressed by external force, the engaging unit 252 will move toward the side plate 204b and push the connecting unit 256, and the fastening unit 254 will move with the connecting unit 256 to separate from the switch hook 213.

After the user places the drive carrier 206 within the chassis module 204 along an arrow direction 270, the protruded portions 222a and 222b are respectively engaged with the apertures 226a and 226b so as to detachably dispose the drive carrier 206 within the chassis module 204. That is, the optical disk drive module 202 is formed by the chassis module 204, drive carrier 206, the disk drive 208, and the cover 210.

Figure 5:
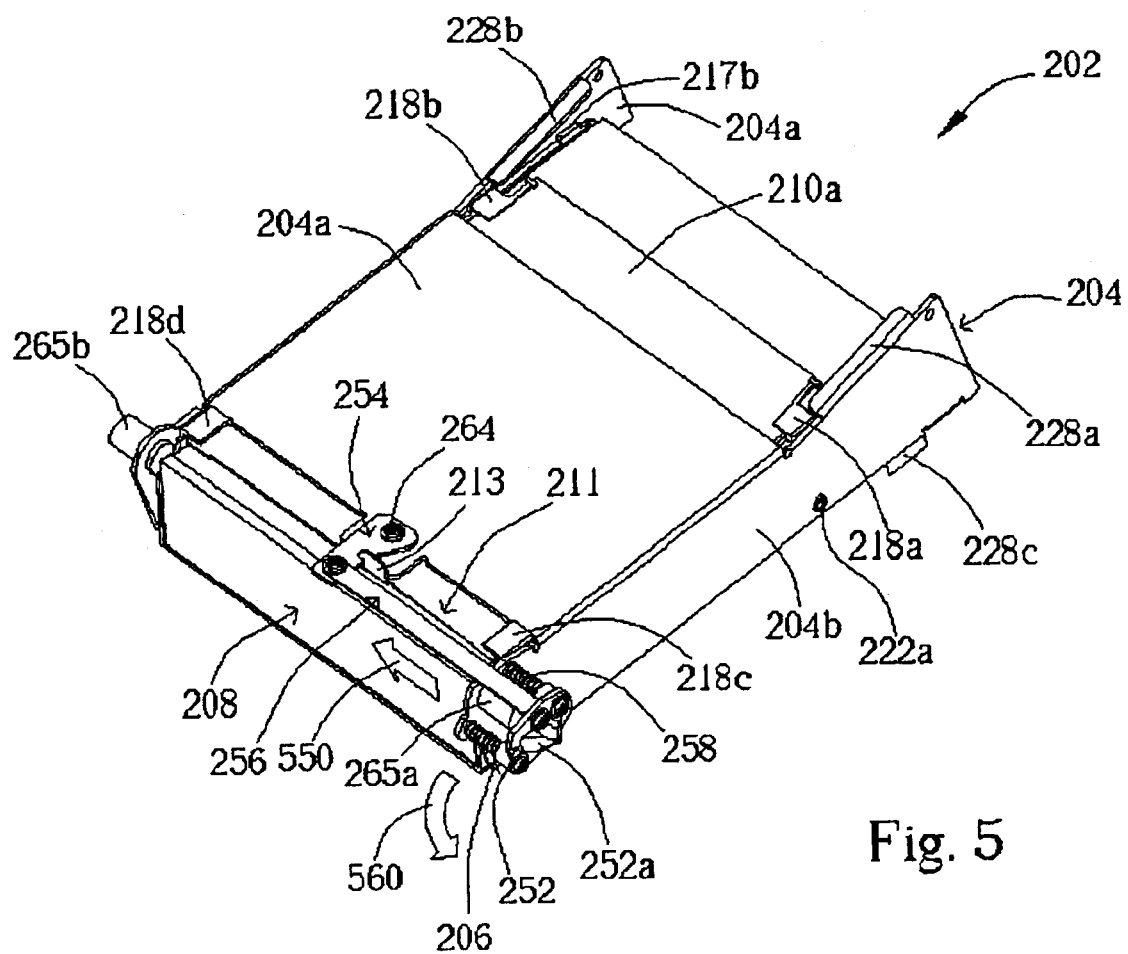
FIG. 5 is a perspective view of the optical disk drive module when the optical disk drive module is enclosed.

Please refer to FIG. 5. FIG. 5 is a perspective view of the optical disk drive module 202 when the optical disk drive module 202 is enclosed. As shown in FIG. 5, the cover 210 is secured onto the disk drive 208, the disk drive 208 is engaged within the drive carrier 206 via the cover 210, and the drive carrier 206 joins with the chassis module 204. Furthermore, the engaging switch 211 is disposed on the chassis module 204, and the fastening unit 254 is fastened to the switch hook 213 so that the drive carrier 206 and the disk drive 208 can be swung toward the chassis module 204. The chassis stoppers 228c and 228b push against the right side of the disk drive 208 to cause the optical disk drive module 202 to be in a closed state. Accordingly, the cover body 210a will be contacted and parallel with the chassis body 204a.

When the user exerts a force onto the protruded piece 252a of the engaging unit 252 and the force is greater than elastic force of the elastic portions 258, the engaging unit 252 will move toward the side plate 204b along an arrow direction 550 and further cause the elastic portions 258 to be compressed. Then, the engaging unit 252 will push the connecting unit 256 along the arrow direction 550 to allow the fastening unit 254 to separate from the switch hook 213 along the arrow direction 550 by using the protruded portion 264 as a pivot. Therefore, the disk drive 206 will rotate with respect to the protruded portions 222a and 222b along an arrow direction 560 so as to allow the drive carrier 206 to swing away from the chassis module 204 to form an open state of the optical disk drive module 202.

When the optical disk drive module 202 is in the open state, the protruded pieces 217a and 217b will push against the chassis stoppers 228a and 228b to stop moving the drive carrier 206 so as to allow the disk drive 208 to be used by the user. Elastic force of the elastic portions 258 will push the engaging unit 252 to the original location of the engaging unit 252. That is, a distance between the engaging unit 252 and the side plate 204b will be restored to the fixed distance, and the engaging switch 211 will be restored to the original shape. Of course, the user can also push the drive carrier 206 upward when the optical disk drive module 202 is in the open state so as to rotate the drive carrier 206 with respect to the protruded portions 222a and 222b along a reverse direction of the arrow direction 560, and then the optical disk drive module 202 will be restored to the closed state. That is, the fastening unit 254 will fasten to the switch hook 213 again, and the chassis stoppers 228c and 228d will push against the right side of the disk drive 208 so that the drive carrier 206 and the disk drive 208 will join with the chassis module 204 again.

Figure 6:
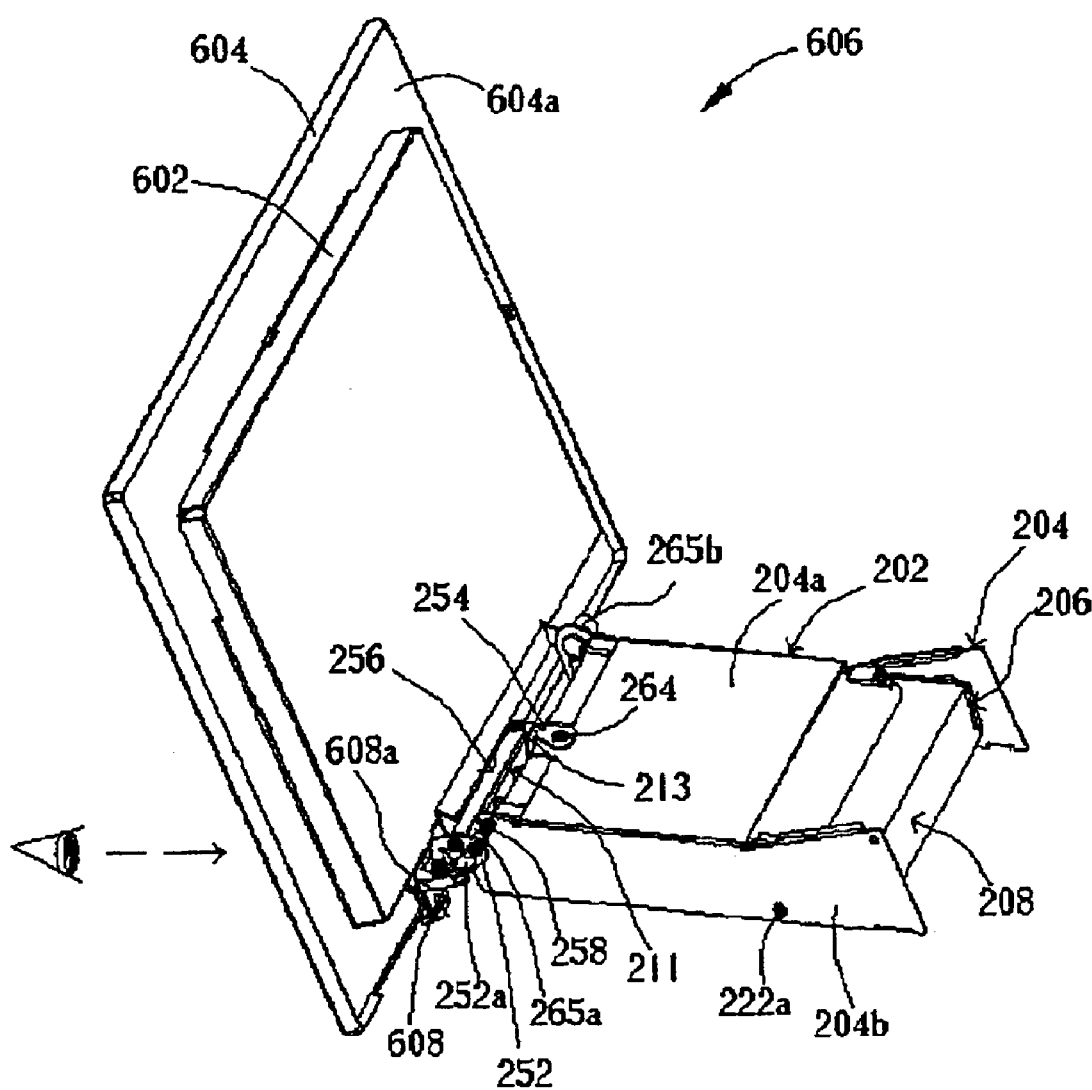
FIG. 6 is a perspective view of a flat panel display personal computer with the optical disk drive module.

The optical disk drive module 202 can also be installed in a flat panel display personal computer. Please refer to FIG. 6. FIG. 6 is a perspective view of a flat panel display personal computer 600 with the optical disk drive module 202 depicted in FIG. 5. As shown in FIG. 6, the flat panel display personal computer 600 comprises a computing module 602, a flat panel display 604, a button 608, and the optical disk drive module 202. The computing module 602 is disposed at a rear side 604a of the flat panel display 604 and coupled with the flat panel display 604. The rear side 604a of the flat panel display 604 has two protruded portions 606a and 606b for engaging with the apertures 265a and 265b of the optical disk drive module 202 so as to detachably dispose the optical disk drive module 202 onto the rear side 604a of the flat panel display 604. That is, when a user takes a look at the flat panel display personal computer 600 from a left side of the flat panel display personal computer 600, the user cannot detect the disk drive 208. This characteristic allows the flat panel display personal computer 600 to have a streamlined shape.

The button 608 is positioned at a front cover of the flat panel display 604 and has a rod 608a for compressing the protruded piece 252a. When the button 608 is pressed down, the rod 608a will compress the protruded piece 252a, and the engaging unit 252 will push the connecting unit 256 so that the fastening unit 254 will separate from the switch hook 213. The drive carrier 206 and the disk drive 208 will swing away from the chassis module 204 to cause the optical disk drive module 202 to be in an open state. Then, when the user takes a look at the flat panel display personal computer 600 from the left side of the flat panel display personal computer 600, the user will see the disk drive 208 so as to place an optical disc within the disk drive 208.

After positioning the optical disc inside the disk drive 208, the user only needs to push the drive carrier 206 upward so as to cause the optical disk drive module 202 to be restored to the closed state. The fastening unit 254 fastens to the switch hook 213 again so that the drive carrier 206 and the disk drive 208 are enclosed in the chassis module 204 to cause the optical disk drive module 202 to be restored to the closed state. The disk drive 208 will access the optical disc or be in a waiting state.

Technologies of the present invention are not limited by the above description. For example, the disk drive 208 can be a CD-ROM drive, a DVD-ROM player, a CD-ROM burner, a DVD-ROM burner, a CD-RW drive, a DVD-RW drive, or a portable hard disk. The present flat panel display personal computer can utilize the optical disk drive module to conceal the disk drive at the rear side of the flat panel display so as to reduce space occupied by hardware, and utilize the switch and the electromagnetic switch to allow the optical disk drive module to lower the disk drive so as to expose the disk drive at the front side of the flat panel display.

In contrast to the prior art, the present flat panel display personal computer can utilize the optical disk drive module to conceal the disk drive at a rear side of the flat panel display so as to reduce space occupied by hardware. The flat panel display personal computer can also utilize the button and the engaging switch to allow the optical disk drive module to lower the disk drive so as to display the disk drive at a front side of the flat panel display.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An optical disk drive module installed in a flat panel display personal computer for lifting up and lowering a disk drive, the flat panel display personal computer comprising a computing module and a flat panel display coupled to the computing module and installed on a rear side of the flat panel display, the optical disk drive module comprising:

a chassis module moveably disposed at the rear side of the flat panel display;

a drive carrier rotatably disposed in the chassis module for positioning the disk drive;

a cover fixed outside the disk drive and slidably fastened within the drive carrier so as to dispose the disk drive in the drive carrier;

a button positioned at a front cover of the flat panel display;

an engaging switch disposed on the chassis module, the engaging switch fastened to the cover so as to enclose the drive carrier in the chassis module;

wherein when depressing the button, the button will push the engaging switch to separate the engaging switch from the cover, and the drive carrier will swing away from the chassis module to expose the disk drive below the flat panel display.

2. The optical disk drive module of claim 1 wherein:

the chassis module comprises:
 a chassis body;
 a first side plate and a second side plate formed at two sides of the chassis body and moveably fastened to the rear side of the flat panel display, the first side plate having a first aperture, the second side plate having a second aperture facing the first aperture;

the drive carrier comprises:
 a carrier body;
 a first side plate and a second side plate formed at two sides of the carrier body, the first side plate having a first protruded portion inserted into the first aperture of the first side plate of the chassis module, the second side plate having a second protruded portion inserted into the second aperture of the second side plate of the chassis module;
 a first positioning hook positioned at an upper end of the first side plate, and a second positioning hook positioned at an upper end of the second side plate; and the cover comprises:
 a cover body having a first positioning slot for receiving the first positioning hook, and a second positioning slot for receiving the second positioning hook so as to fasten the cover within the drive carrier;
 a first side plate and a second side plate formed at two sides of the cover body and outside of the disk drive so as to fix the cover outside of the disk drive, the first side plate and the second side plate being slidably disposed within the drive carrier so as to dispose the disk drive within the drive carrier; and
 a switch hook positioned on the cover body for engaging with the engaging switch;

wherein when the drive carrier rotates with respect to the first protruded portion and the second protruded portion to swing away from the chassis module, the optical disk drive module will lower the disk drive to expose the disk drive below the flat panel display; and when the drive carrier rotates with respect to the first protruded portion and the second protruded portion to swing toward the chassis module, the optical disk drive module will raise up the disk drive to position the disk drive at the rear side of the flat panel display.

3. The optical disk drive module of claim 2 wherein the button comprises a rod to be pushed by a user.

4. The optical disk drive module of claim 3 wherein the engaging switch comprises:

an engaging unit disposed on the first side plate of the chassis module, a plurality of elastic elements separating the engaging unit and the first side plate of the chassis module by a predetermined distance, a protruded portion formed on one side of the engaging unit to be pushed by the rod;

a fastening unit moveably disposed on the chassis body having an end fastened to the switch hook so as to enclose the drive carrier within the chassis module; and a connecting unit connected between the engaging unit and the fastening unit;

wherein when depressing the button, the rod will push the protruded portion to cause the engaging unit moving toward the first side plate of the chassis module and the fastening unit will move with the connecting unit to separate from the switch hook.

5. An optical disk drive module installed in a flat panel display personal computer for lifting up and lowering a disk drive, the flat panel display personal computer comprising a computing module and a flat panel display coupled to the computing module and installed on a rear side of the flat panel display, the optical disk drive module comprising:

a chassis module moveably disposed at the rear side of the flat panel display having a chassis body, and a first side plate disposed at one side of the chassis body;

a drive carrier rotatably disposed in the chassis module;

a cover fixed outside the disk drive and slidably fastened within the drive carrier so as to dispose the disk drive in the drive carrier, the cover having a switch hook;

a button positioned at a front cover of the flat panel display and having a rod to be pushed by a user; and an engaging switch disposed on the chassis module comprising:

an engaging unit disposed on the first side plate of the chassis module, a plurality of elastic elements separating the engaging unit and the first side plate of the chassis module by a predetermined distance, a protruded portion formed on one side of the engaging unit to be pushed by the rod;

a fastening unit moveably disposed on the chassis body having an end fastened to the switch hook so as to enclose the drive carrier within the chassis module; and a connecting unit connected between the engaging unit and the fastening unit;

wherein when depressing the button, the rod will push the protruded portion to cause the engaging unit moving toward the first side plate of the chassis module, the fastening unit will move with the connecting unit to separate from the switch hook, and the drive module will lower the disk drive to expose the disk drive below the flat panel display.

6. The optical disk drive module of claim 5 wherein:

the chassis module further comprises:
- a second side plate disposed at another side of the chassis body, the first and second side plates moveably fastened to the rear side of the flat panel display, the first side plate having a first aperture, the second side plate having a second aperture facing the first aperture;

the drive carrier comprises:
- a carrier body;
- a first side plate and a second side plate formed at two sides of the carrier body, the first side plate having a first protruded portion inserted into the first aperture of the first side plate of the chassis module, the second side plate having a second protruded portion inserted into the second aperture of the second side plate of the chassis module; and
- a first positioning hook positioned at an upper end of the first side plate, and a second positioning hook positioned at an upper end of the second side plate; and the cover further comprises:
- a cover body having a first positioning slot for receiving the first positioning hook, and a second positioning slot for receiving the second positioning hook so as to fasten the cover within the drive carrier;
- a first side plate and a second side plate formed at two sides of the cover body and outside of the disk drive so as to fix the cover outside of the disk drive, the first side plate and the second side plate being slidably disposed within the drive carrier so as to dispose the disk drive within the drive carrier;

wherein when the drive carrier rotates with respect to the first protruded portion and the second protruded portion to swing away from the chassis module, the optical disk drive module will lower the disk drive to expose the disk drive below the flat panel display; and when the drive carrier rotates with respect to the first protruded portion and the second protruded portion to swing toward the chassis module, the optical disk drive module will raise up the disk drive to position the disk drive at the rear side of the flat panel display.

7. A flat panel display personal computer comprising:

a flat panel display;

a computing module installed on a rear side of the flat panel display and coupled to the flat panel display; and an optical disk drive module disposed at the rear side of the flat panel display for lifting up and lowering a disk drive, the optical disk drive module comprising:
- a chassis module moveably disposed at the rear side of the flat panel display;
  - a drive carrier rotatably disposed in the chassis module for positioning the disk drive;
  - a cover fixed outside the disk drive and slidably fastened within the drive carrier so as to dispose the disk drive in the drive carrier;
  - a button positioned at a front cover of the flat panel display; and
  - an engaging switch disposed on the chassis module, the engaging switch fastened to the cover so as to enclose the drive carrier in the chassis module;

wherein when depressing the button, the button will push the engaging switch to separate the engaging switch from the cover, and the drive carrier will swing away from the chassis module to expose the disk drive below the flat panel display.

8. The flat panel display personal computer of claim 7 wherein:

the chassis module comprises:
- a chassis body;
- a first side plate and a second side plate formed at two sides of the chassis body and moveably fastened to the rear side of the flat panel display, the first side plate having a first aperture, the second side plate having a second aperture facing the first aperture;

the drive carrier comprises:
- a carrier body;
- a first side plate and a second side plate formed at two sides of the carrier body, the first side plate having a first protruded portion inserted into the first aperture of the first side plate of the chassis module, the second side plate having a second protruded portion inserted into the second aperture of the second side plate of the chassis module;
- a first positioning hook positioned at an upper end of the first side plate, and a second positioning hook positioned at an upper end of the second side plate; and the cover comprises:
- a cover body having a first positioning slot for receiving the first positioning hook, and a second positioning slot for receiving the second positioning hook so as to fasten the cover within the drive carrier;
- a first side plate and a second side plate formed at two sides of the cover body and outside of the disk drive so as to fix the cover outside of the disk drive, the first side plate and the second side plate being slidably disposed within the drive carrier so as to dispose the disk drive within the drive carrier; and
- a switch hook positioned on the cover body for engaging with the engaging switch;

wherein when the drive carrier rotates with respect to the first protruded portion and the second protruded portion to swing away from the chassis module, the optical disk drive module will lower the disk drive to expose the disk drive below the flat panel display; and when the drive carrier rotates with respect to the first protruded portion and the second protruded portion to swing toward the chassis module, the optical disk drive module will raise up the disk drive to position the disk drive at the rear side of the flat panel display.

9. The flat panel display personal computer of claim 8 wherein the button comprises a rod to be pushed by a user.

10. The flat panel display personal computer of claim 9 wherein the engaging switch comprises:
- an engaging unit disposed on the first side plate of the chassis module, a plurality of elastic elements separating the engaging unit and the first side plate of the chassis module by a predetermined distance, a protruded portion formed on one side of the engaging unit to be pushed by the rod;
- a fastening unit moveably disposed on the chassis body having an end fastened to the switch hook so as to enclose the drive carrier within the chassis module; and
- a connecting unit connected between the engaging unit and the fastening unit;

wherein when depressing the button, the rod will push the protruded portion to cause the engaging unit moving toward the first side plate of the chassis module and the fastening unit will move with the connecting unit to separate from the switch hook.

* * * * *